US012775992B2

(12) United States Patent
Lv et al.

(10) Patent No.: US 12,775,992 B2
(45) Date of Patent: Oct. 27, 2026

(54) SCHEDULING SYSTEM AND METHOD FOR INTELLIGENT MOBILE ROBOT

(71) Applicant: LINGDONG TECHNOLOGY (BEIJING) CO.LTD., Beijing (CN)

(72) Inventors: Junlong Lv, Beijing (CN); Jinfeng Pan, Beijing (CN); Yinhang Bao, Beijing (CN)

(73) Assignee: LINGDONG TECHNOLOGY (BEIJING) CO.LTD., Beijing (CN)

( * ) Notice: Subject to any disclaimer, the term of this patent is extended or adjusted under 35 U.S.C. 154(b) by 272 days.

(21) Appl. No.: 18/562,828

(22) PCT Filed: Mar. 22, 2022

(86) PCT No.: PCT/CN2022/082264
§ 371 (c)(1),
(2) Date: Nov. 21, 2023

(87) PCT Pub. No.: WO2022/242295
PCT Pub. Date: Nov. 24, 2022

(65) Prior Publication Data

US 2024/0370963 A1 Nov. 7, 2024

(30) Foreign Application Priority Data

May 21, 2021 (CN) ......................... 202110559826.1

(51) Int. Cl.
*G06T 1/00* (2006.01)
*G05D 1/648* (2024.01)
(Continued)

(52) U.S. Cl.
CPC ........... *G06T 1/0014* (2013.01); *G05D 1/648* (2024.01); *G06Q 10/08* (2013.01);
(Continued)

(58) Field of Classification Search
CPC .. G06T 1/0014; G05D 1/648; G05D 2107/70; G05D 1/247; G05D 1/6987;
(Continued)

(56) References Cited

U.S. PATENT DOCUMENTS 12,008,496 B1 * 6/2024 Vasanth ......... G06Q 10/063114
2015/0203304 A1 * 7/2015 Morency ................ B65G 59/02
414/797
(Continued)

FOREIGN PATENT DOCUMENTS

CN 105651286 A 6/2016
CN 109230148 A 1/2019
(Continued)

OTHER PUBLICATIONS

Machine translation of CN 112070007 (Year: 2020).*
(Continued)

*Primary Examiner* — Brandon D Lee
(74) *Attorney, Agent, or Firm* — NZ Carr Law Office

(57) ABSTRACT

Disclosed is a scheduling system for an intelligent mobile robot. The scheduling system (10) comprises a processor (100). The processor (100) is configured to: obtain an image about at least one working region of a working table (102); receive a query request from at least one intelligent mobile robot (104); and analyze the obtained image in response to the query request to recognize a current state of each working region, and on the basis of the query request and the recognized current state of each working region, select a corresponding working region suitable for the at least one intelligent mobile robot (104) from the at least one working region, and send a corresponding scheduling instruction to the intelligent mobile robot (104) to instruct the intelligent mobile robot (104) to move to the selected corresponding working region. By using the scheduling system of the
(Continued)

invention, intelligent mobile robots can be scheduled in a timely manner to travel to suitable working regions, such that the waiting time is saved, congestion is avoided, the scheduling efficiency is improved, and related operation services of the working table are effectively managed. Further comprised are a scheduling method and a non-transitory computer-readable storage medium.

13 Claims, 5 Drawing Sheets

(51) Int. Cl.

| | |
|---|---|
| ***G05D 107/70*** | (2024.01) |
| ***G06Q 10/08*** | (2024.01) |
| ***G06Q 10/109*** | (2023.01) |
| ***G06V 20/50*** | (2022.01) |

(52) U.S. Cl.
CPC ......... *G06Q 10/1097* (2013.01); *G06V 20/50* (2022.01); *G05D 2107/70* (2024.01)

(58) Field of Classification Search
CPC ........... G05D 2105/28; G05D 2109/10; G06Q 10/08; G06Q 10/1097; G06Q 10/0631; G06Q 50/04; G06V 20/50; B25J 13/00; B25J 9/161; B25J 9/1612; B25J 9/1661; B25J 9/1697
See application file for complete search history.

(56) References Cited

U.S. PATENT DOCUMENTS

| | | | | |
|---|---|---|---|---|
| 2016/0129592 | A1* | 5/2016 | Saboo | B25J 19/021 700/248 |
| 2018/0137452 | A1* | 5/2018 | Khatravath | G06Q 10/063114 |
| 2020/0042009 | A1* | 2/2020 | Yang | G05D 1/0246 |
| 2020/0167734 | A1* | 5/2020 | Hoofard | G07C 3/00 |

FOREIGN PATENT DOCUMENTS

| | | | | |
|---|---|---|---|---|
| CN | 109318231 | | 2/2019 | |
| CN | 109388093 A | | 2/2019 | |
| CN | 109693224 A | | 4/2019 | |
| CN | 109968345 A | | 7/2019 | |
| CN | 110059926 | | 7/2019 | |
| CN | 110119889 | | 8/2019 | |
| CN | 111762519 A | | 10/2020 | |
| CN | 112070007 | | 12/2020 | |
| CN | 112070007 A | * | 12/2020 | G06V 20/10 |
| DE | 102013000569 | | 7/2014 | |
| DE | 102018208080 B3 | | 9/2019 | |
| WO | 2016129045 | | 8/2016 | |

OTHER PUBLICATIONS

The international search report of the corresponding PCT Application No. PCT/CN2022/082264 mailed on May 27, 2022 along with English translation thereof.
(ISA/237) Written Opinion of the International Searching Authority dated May 18, 2022.
The office action of the corresponding CN Patent Application No. 202110559826.1 (with English translation thereof) issued on Jun. 27, 2025.
The second office action of the corresponding CN Patent Application No. 202110559826. 1 (with English translation thereof) issued on Dec. 29, 2025.
The office action of the corresponding CN Patent Application No. 202110559826.1 (with English translation thereof) issued on Jan. 14, 2025.
Training Guide for Tropical Agricultural Product Warehousing and Distribution Technology; May 2014; China Economic Publishing House.

* cited by examiner

SCHEDULING SYSTEM AND METHOD FOR INTELLIGENT MOBILE ROBOT

TECHNICAL FIELD

The present invention relates to the field of intelligent mobile robots, and in particular to a scheduling system and method for an intelligent mobile robot.

BACKGROUND

Intelligent mobile robots, also known as Automated Mobility Robots ("AMRs"), such as automatic guided vehicles or various other intelligent devices with an automatic driving function, have been deployed in a variety of scenarios to replace manual labor in carrying cargo or achieving other auxiliary functions. For example, intelligent mobile robots can transport cargo from storage regions to packing tables in warehouses, where they can then be unloaded. The unloaded cargo can be packed at the packing tables and subsequently shipped. However, there are usually multiple intelligent mobile robots performing transporting or unloading tasks in warehouses, and sometimes the intelligent mobile robots need to line up or wait for empty pallets.

Therefore, an improved solution for reasonable scheduling of intelligent mobile robots is desired.

SUMMARY

An objective of the present invention is to provide a solution that can solve or at least ameliorate the above problems. The solution can not only improve the scheduling efficiency of intelligent mobile robots, but also improve the efficiency of cargo packaging and transport in traditional manufacturing and logistics industries.

According to a first aspect of the present invention, a scheduling system is provided. The scheduling system is configured to manage an intelligent mobile robot according to a state of a working table. The scheduling system comprises a processor, and the processor is configured to:

- obtain from an image acquisition device an image about at least one working region of the working table;
- receive a query request from at least one intelligent mobile robot;
- analyze the obtained image in response to the query request to recognize a current state of each working region of the at least one working region; and
- select a corresponding working region suitable for the at least one intelligent mobile robot from the at least one working region based on the query request and the recognized current state of each working region, and send a corresponding scheduling instruction to the at least one intelligent mobile robot to instruct the at least one intelligent mobile robot to move to the selected corresponding working region.

In an embodiment, analyzing the obtained image to recognize the current state of each working region of the at least one working region comprises: analyzing a current frame of the obtained image to recognize a corresponding number of each working region in the image and determine whether the state of each working region with the corresponding number is available or occupied.

In an embodiment, the available state comprises an empty cargo space state and an empty pallet state.

In an embodiment, selecting a corresponding working region suitable for the at least one intelligent mobile robot from the at least one working region based on the query request and the recognized current state of each working region comprises:

determining a current task of the at least one intelligent mobile robot at least according to the query request of the at least one intelligent mobile robot, and selecting from the at least one working region a suitable working region matching the current task of the at least one intelligent mobile robot based on the current task of the at least one intelligent mobile robot and the recognized current state of each working region.

In an embodiment, the processor is further configured to:

when it is determined that the current task of the intelligent mobile robot is to transport cargo, send the scheduling instruction to instruct the intelligent mobile robot to move to a working region in the empty cargo space state; and/or, when it is determined that the current task of the intelligent mobile robot is to pick up an empty pallet, send the scheduling instruction to instruct the intelligent mobile robot to move to a working region in the empty pallet state.

In an embodiment, the scheduling system further comprises an image acquisition device positioned above the working table and configured to capture an image about at least one working region of the working table in real time.

In an embodiment, the scheduling system further comprises at least one intelligent mobile robot, and the at least one intelligent mobile robot is configured to:

send the query request in a case of the intelligent mobile robot at a predetermined distance from the working table, when the current task of the intelligent mobile robot is to transport cargo; and/or, immediately send the query request in a case when the current task of the intelligent mobile robot is to pick up an empty pallet.

In an embodiment, the processor is further configured to:

in the case when the current task of the intelligent mobile robot is to transport cargo, instruct the intelligent mobile robot to wait at a predetermined position and regularly analyze the image of the working table to monitor the state of the at least one working region if it is determined according to the recognized current state of each working region that there is currently no working region in the empty cargo space state, and instruct the intelligent mobile robot to travel to a working region in the empty cargo space state if a working region in the empty cargo space state is found; and/or, in the case when the current task of the intelligent mobile robot is to pick up an empty pallet, instruct the intelligent mobile robot to move to an empty-pallet storage region to pick up an empty pallet if it is determined according to the recognized current state of each working region that there is currently no working region in the empty pallet state.

According to a second aspect of the present invention, a scheduling method is provided. The scheduling method is configured to manage an intelligent mobile robot according to a state of a working table. The scheduling method comprises executing computer instructions to perform the following operations:

- obtaining from an image acquisition device an image about at least one working region of the working table;
- receiving a query request from at least one intelligent mobile robot;
- analyzing the obtained image in response to the query request to recognize a current state of each working region of the at least one working region, and
- selecting a corresponding working region suitable for the at least one intelligent mobile robot from the at least one working region on the basis of the query request and the recognized current state of each working region, and sending a corresponding scheduling instruction to the at least one intelligent mobile robot to instruct the at least one intelligent mobile robot to move to the selected corresponding working region.

In an embodiment of the present invention, the operation of analyzing the obtained image to recognize the current state of each working region of the at least one working region comprises:

analyzing a current frame of the obtained image to recognize a corresponding number of each working region in the image and determine whether the state of each working region with the corresponding number is an available state or an occupied state.

In an embodiment, the available state comprises an empty cargo space state and an empty pallet state.

In an embodiment, selecting a corresponding working region suitable for the at least one intelligent mobile robot from the at least one working region based on the query request and the recognized current state of each working region comprises:

determining a current task of the at least one intelligent mobile robot at least according to the query request of the at least one intelligent mobile robot, and selecting from the at least one working region a suitable working region matching the current task of the at least one intelligent mobile robot based on the current task of the at least one intelligent mobile robot and the recognized current state of each working region.

In an embodiment, the method further comprises:

when it is determined that the current task of the intelligent mobile robot is to transport cargo, sending the scheduling instruction to instruct the intelligent mobile robot to move to a working region in the empty cargo space state; and/or, when it is determined that the current task of the intelligent mobile robot is to pick up an empty pallet, sending the scheduling instruction to instruct the intelligent mobile robot to move to a working region in the empty pallet state.

In an embodiment, the at least one intelligent mobile robot is configured to:

send the query request in a case of the intelligent mobile robot at a predetermined distance from the working table, when the current task of the intelligent mobile robot is to transport cargo; and/or, immediately send the query request in a case when the current task of the intelligent mobile robot is to pick up an empty pallet.

In an embodiment, the method further comprises:

in the case when the current task of the intelligent mobile robot is to transport cargo, instructing the intelligent mobile robot to wait at a predetermined position and regularly analyzing the image of the working table to monitor the state of the at least one working region if it is determined according to the recognized current state of the at least one working region that there is currently no working region in the empty cargo space state, and instructing the intelligent mobile robot to move to a working region in the empty cargo space state if a working region in the empty cargo space state is found; and/or, in the case when the current task of the intelligent mobile robot is to pick up an empty pallet, instructing the intelligent mobile robot to move to an empty-pallet storage region to pick up an empty pallet if it is determined according to the recognized current state of at least one working region that there is currently no working region in the empty pallet state.

According to a third aspect of the present invention, provided is a non-transitory computer-readable storage medium having computer instructions stored thereon, wherein the computer instructions, when executed by the processor, cause the scheduling method described above to be implemented.

The scheduling system according to the solution of the present invention can flexibly manage the traveling of the intelligent mobile robot according to the real-time state of the working table. For example, there are usually multiple intelligent mobile robots performing a transporting or unloading task in a warehouse at the same time, and some intelligent mobile robots may also need to pick up empty pallets before performing pickup tasks. The packing table is usually equipped with multiple unloading positions. If the scheduling system does not know the cargo state of each unloading position, it may cause untimely scheduling, which will cause the intelligent mobile robots to wait in line for a long time, or cause congestion and other problems, leading to low driving efficiency of intelligent mobile robots.

Advantageously, the processor of the scheduling system of the present invention can obtain the image of each working region of the working table in real time, and when receiving a query request from the intelligent mobile robot, can analyze the current frame of the obtained image in response to the query request to recognize the state of each working region in the image, such as an available state or an occupied state (the available state further comprises an empty cargo space state or an empty pallet state), and then can select a suitable working region for the intelligent mobile robot that sends the query request, and send a corresponding scheduling instruction to the intelligent mobile robot to instruct the intelligent mobile robot to move to the selected working region. Therefore, the scheduling system and method of the present invention can schedule the intelligent mobile robot to travel to an appropriate working region in a timely manner, thereby saving waiting time, avoiding congestion, and improving scheduling efficiency, and ensuring that intelligent mobile robots around the working table can operate efficiently. The scheduling system and method can also manage the related operations of the working table to improve the processing efficiency of the working table.

BRIEF DESCRIPTION OF THE DRAWINGS

Non-limiting and non-exhaustive embodiments of the invention are described by way of example with reference to the following figures, in which.

For better understanding, where possible, the same reference numerals have been used to refer to common elements throughout the drawings.

DETAILED DESCRIPTION OF EMBODIMENTS

In order to make the above and other features and advantages of the present invention clearer, the present invention is further described below in conjunction with the accompanying drawings. In the following description, numerous specific details are set forth to provide a thorough understanding of the invention. It should be understood that the specific embodiments given herein are for the purpose of explanation to those skilled in the art, and are only illustrative and not restrictive. Moreover, the sizes and scales of the components in the figures are only schematic and do not correspond to actual products.

Embodiments described herein relate to a scheduling system and method for an intelligent mobile robot. It should be understood that the "intelligent mobile robot" used herein is intended to cover any type of intelligent device with an automatic driving function, such as intelligent/autonomous navigation mobile robots, inertial guidance robots, remote-controlled mobile robots, autonomous vehicles and robots guided by laser sights, vision systems or road maps, etc.

Figure 1A:
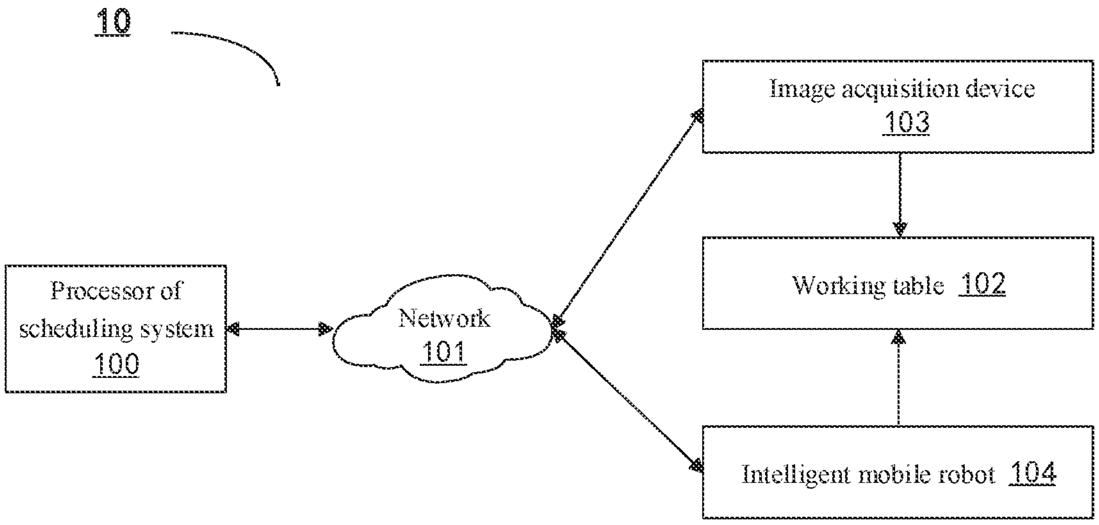
FIG. 1A illustrates an exemplary schematic diagram of a scheduling system according to an embodiment of the present invention.

FIG. 1A illustrates an exemplary schematic diagram of a scheduling system 10 for managing an intelligent mobile robot according to the state of a working table according to an embodiment of the present invention. The scheduling system 10 at least comprises a processor 100. The processor 100 is communicatively coupled via a network 101 to an image acquisition device 103 positioned above a working table 102 and to an intelligent mobile robot 104 within a facility (e.g., a warehouse). Optionally, the processor 100 of the scheduling system communicates with the image acquisition device 103 and/or the intelligent mobile robot 104 via 4G, 5G, Bluetooth™, WiFi, ZigBee™ or other wireless communication protocols. The image acquisition device 103 may include, but is not limited to, a monocular camera, a binocular camera and/or a stereo camera. In some embodiments, the image acquisition device 103 is positioned above the working table 102 and configured to capture an image about at least one working region of the working table in real time.

In an embodiment, the number of intelligent mobile robots 104 may be at least one, for example, one, two, three or any more. The processor 100 of the scheduling system receives a query request from at least one intelligent mobile robot 104 via the network 101, and in response to the query request, analyzes in real time a current frame of the image of the working table 102 obtained from the image acquisition device 103 to recognize a current state of each working region of the working table 102. The processor 100 of the scheduling system selects a corresponding working region suitable for the at least one intelligent mobile robot from the at least one working region on the basis of the query request and the recognized current state of each working region of the working table 102, and sends a corresponding scheduling instruction, via the network 101, to the at least one intelligent mobile robot 104 to instruct the at least one intelligent mobile robot 104 to move to the selected corresponding working region. The processor 100 of the scheduling system interacts with the at least one intelligent mobile robot 104 to transmit signals, and enables the intelligent mobile robot 104 to drive, wait, and perform various other operations according to instructions of the processor.

Figure 1B:
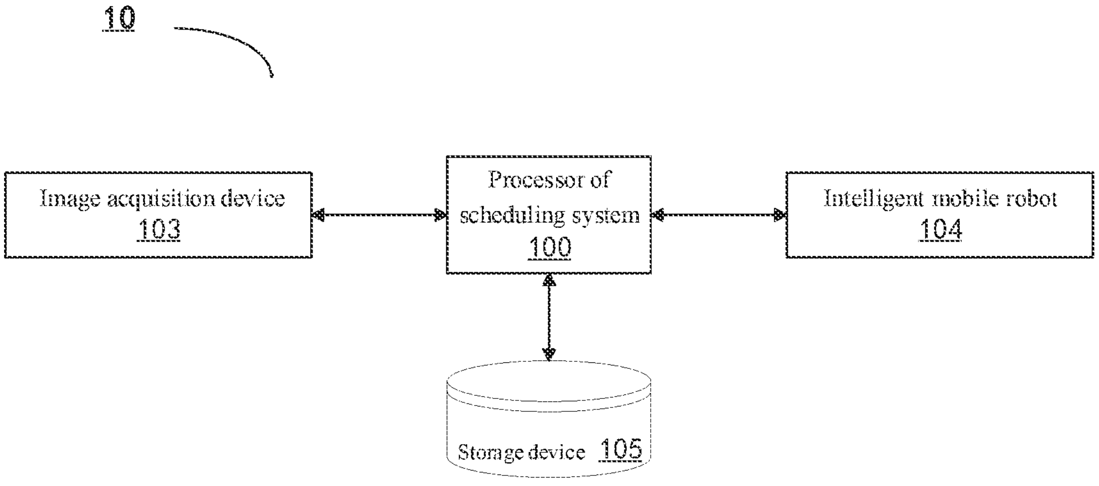
FIG. 1B illustrates another exemplary schematic diagram of a scheduling system according to an embodiment of the present invention.

FIG. 1B illustrates another exemplary schematic diagram of the scheduling system 10 for managing an intelligent mobile robot according to the state of a working table according to an embodiment of the present invention. In addition to the processor 100, the scheduling system 10 may further include any one or more of an image acquisition device 103, a storage device 105, and an intelligent mobile robot 104.

Figure 2A:
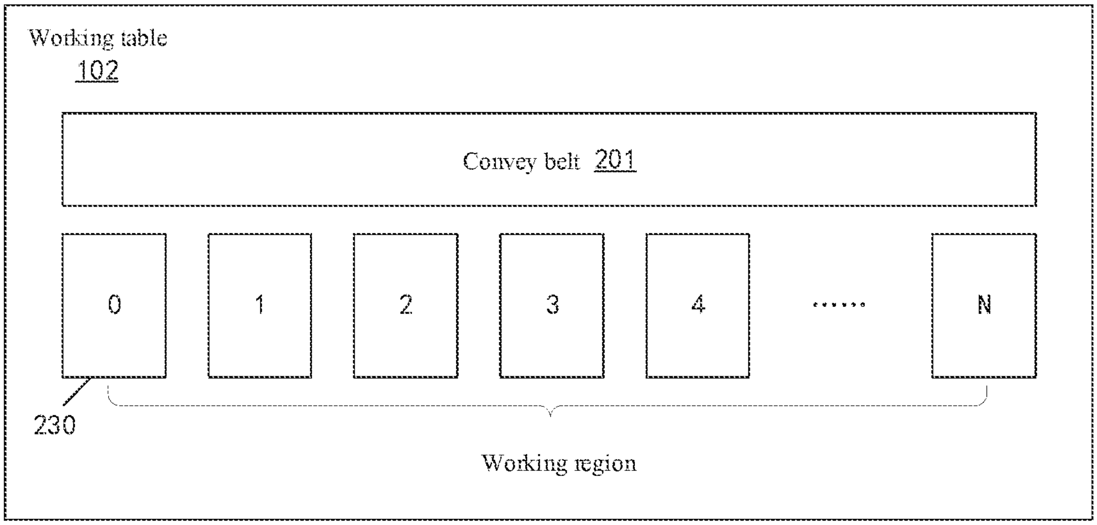
FIG. 2A illustrates an exemplary schematic diagram of working regions of a working table according to an embodiment of the present invention.

In one embodiment, the image acquisition device 103 is positioned above the working table 102 and configured to capture an image about at least one working region of the working table in real time (as shown in FIG. 2A below), and the storage device 105 is configured to store various types of information received by the processor 100 of the scheduling system and various scheduling instructions generated by the processor 100 of the scheduling system.

In another embodiment, after receiving a query request from at least one intelligent mobile robot 104, the processor 100 of the scheduling system obtains an image about the working table 102 from the image acquisition device 103 in real time in response to the query request, and then analyzes a current frame of the obtained image to recognize a corresponding number of at least one working region in the image and determine whether the state of each working region with the corresponding number is an available state or an occupied state. Specifically, the available state further comprises an empty cargo space state (no cargo and no pallets) and an empty pallet state (no cargo but empty pallets).

In some embodiments, the processor 100 of the scheduling system may determine a current task of the at least one intelligent mobile robot 104 at least according to the query request of the at least one intelligent mobile robot 104, and select from the at least one working region a suitable working region matching the current task of the at least one intelligent mobile robot based on the current task of the at least one intelligent mobile robot 104 and the recognized current state of each working region. In a case when there are multiple suitable working regions that match the current task of an intelligent mobile robot, a closer working region can also be selected for the intelligent mobile robot according to the distances between the working regions and the intelligent mobile robot.

In some embodiments, the processor 100 of the scheduling system interacts with the at least one intelligent mobile robot 104 to instruct the intelligent mobile robot to perform various operational tasks, for example, instruct the at least one intelligent mobile robot 104 to move to a selected working region marked with the empty cargo space state to transport cargo or to move to a selected working region marked with the empty pallet state to pick up an empty pallet, and so on.

FIG. 2A illustrates an exemplary schematic diagram of working regions marked with corresponding numbers according to an embodiment of the present invention. As shown in FIG. 2A, the working table 102 comprises working regions 230, and the working table and its working regions may be, for example, at a packing table or any other operation station in a warehouse. In an embodiment, the packing table is optionally configured as a conveyor belt 201, and the working regions may refer to, for example, unloading regions on one side and/or both sides of the conveyor belt. The image about the working table among the images captured by the image acquisition device 103 may include images of the conveyor belt and all working regions as shown in FIG. 2A.

In another embodiment, each of the working regions may have a corresponding number, such as number 0 to number N (a natural number greater than or equal to 1), totaling to N+1. In an embodiment, the numbers of the working regions may be obtained by recognizing ground markings in a variety of ways. For example, the ground markings may include machine-readable features representing the working regions, or multiple ground markings themselves (e.g., multiple regularly arranged lines) may form a map so that the number of each working region can be easily determined by recognizing the coordinate position of the ground markings on the map. In the case where the ground markings include machine-readable features, the machine-readable features can be recognized by the processor and the intelligent mobile robot 104. The machine-readable features may include but are not limited to, numbers, letters, QR codes, and barcodes, symbols or any combination thereof.

In some existing warehouses, for better management, the working table and the working regions of the working table are clearly divided using landmark lines. For example, the scope of the conveyor belt 201 may be divided by landmark lines, and each working region may also be divided by landmark lines. The present invention can use these existing landmark lines to allow the processor of the scheduling system to recognize corresponding working regions, and then manage and schedule the intelligent mobile robot according to the state of each working region.

In another embodiment, the numbers of the working regions may also not be recognized by ground markings, and the numbers of the working regions may be customized in combination with electronic maps and/or gridding processing methods when the processor processes images about working regions, and the corresponding positions of the working regions with customized numbers are sent to the intelligent mobile robot.

Figure 2B:
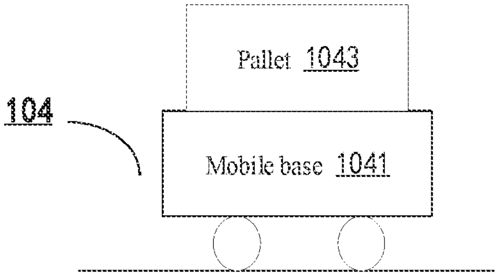
FIG. 2B illustrates an exemplary simplified schematic diagram of an intelligent mobile robot with a cargo pallet according to an embodiment of the present invention.
Figure 2C:
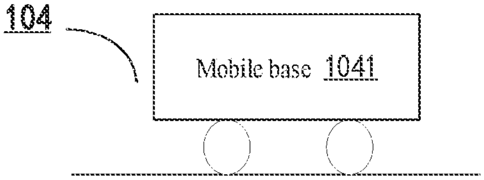
FIG. 2C illustrates an exemplary simplified schematic diagram of an intelligent mobile robot without a cargo pallet according to an embodiment of the present invention.

FIG. 2B illustrates an exemplary simplified schematic diagram of the intelligent mobile robot 104 having a cargo pallet 1043 matching the intelligent mobile robot 104 according to an embodiment of the present invention. FIG. 2C illustrates an exemplary simplified schematic diagram of an intelligent mobile robot 104 without a cargo pallet according to an embodiment of the present invention. In an embodiment, the intelligent mobile robot 104 at least comprises a mobile base 1041, as shown in FIG. 2C. In another embodiment, the intelligent mobile robot 104 may further include a pallet 1043 for carrying cargo, as shown in FIG. 2B.

In some embodiments, the cargo is placed directly on the upper surface of the mobile base 1041 of the intelligent mobile robot 104. Or preferably, the cargo may also be placed directly on the pallet 1043 matching the intelligent mobile robot 104. The mobile base 1041 may be connected by lifting or dragging and drive the pallet 1043 to move together, thereby transporting the cargo carried on the pallet 1043. In this case, compared with manner in which the cargo is directly stacked on the upper surface of the mobile base 1041 of the intelligent mobile robot 104, the pallet 1043 may have a larger cargo loading capacity, and the intelligent mobile robot 104 can directly connect to the pallet 1043 and leave without waiting for loading of cargo. When the intelligent mobile robot 104 as shown in FIG. 2B is used to transport cargo to the working table 102 as shown in FIG. 2A, after the cargo is unloaded, the empty pallet 1043 may be left in the corresponding working region (e.g., a unloading position), the working region will be in an available state, more specifically in an empty pallet state. Or, when the intelligent mobile robot 104 as shown in FIG. 2C is used to transport cargo to the working table 102 as shown in FIG. 2A, after the cargo is unloaded, the corresponding working region will be in an available state, more specifically in an empty cargo space state (i.e., a state of no cargo and no pallet).

In some embodiments, the pallet 1043 may be, but is not limited to, a flat plate, a tray, a basket, a box, or any other type of container or wheeled cart that can be used to hold, carry, and/or transport items. Different types of pallets 1043 can be adapted to different types of intelligent mobile robots 104. Moreover, the same type of pallet 1043 may be applicable to many different types of intelligent mobile robots 104, or may be applicable to a single type of intelligent mobile robot 104.

Figure 3:
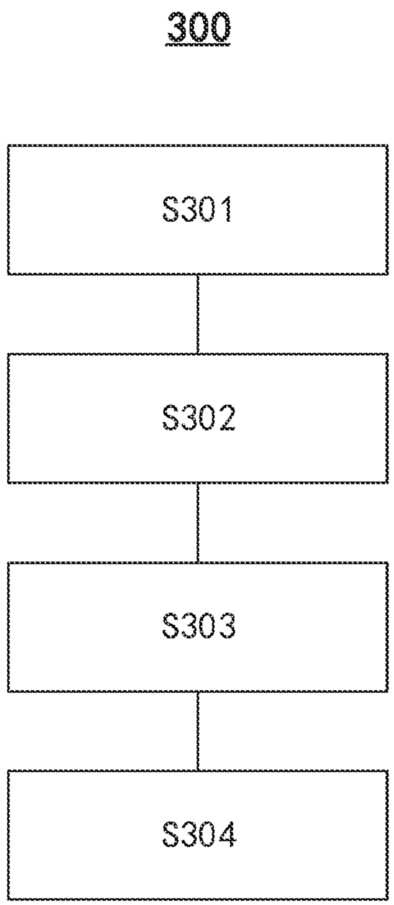
FIG. 3 illustrates a schematic flow chart of a scheduling method for managing an intelligent mobile robot according to an embodiment of the present invention.

FIG. 3 illustrates a schematic flow chart of a scheduling method 300 for managing an intelligent mobile robot according to an embodiment of the present invention.

The scheduling method 300 comprises steps S301-S304. Specifically, in step S301, the processor 100 of the scheduling system obtains, via the image acquisition device 103, an image about at least one working region of the working table 102 in real time.

In step S302, the processor 100 of the scheduling system receives a query request from the at least one intelligent mobile robot 104 via Bluetooth™, WiFi, ZigBee™ or other wireless communication protocols. In an embodiment, the inquiry request may be, for example, a request as to whether it is possible to move to the at least one working region to pick up cargo, transport cargo, or pick up an empty pallet.

In step S303, the processor 100 of the scheduling system analyzes the obtained image in response to the query request to recognize a current state of each working region of the at least one working region. In some embodiments, the processor 100 of the scheduling system further analyzes a current frame of the obtained image to recognize a corresponding number of each working region in the image and determine whether the state of each working region with the corresponding number is the empty cargo space state or the empty pallet state.

In step S304, the processor 100 of the scheduling system selects a corresponding working region suitable for the at least one intelligent mobile robot from the at least one working region on the basis of the query request and the recognized current state of each working region, and sends a corresponding scheduling instruction to the at least one intelligent mobile robot 104 to instruct the at least one intelligent mobile robot 104 to move to the selected corresponding working region.

In some embodiments, the processor 100 of the scheduling system further determines a current task of the at least one intelligent mobile robot 104 at least according to the query request of the at least one intelligent mobile robot 104, and selects from the at least one working region a suitable working region matching the current task of the at least one intelligent mobile robot based on the current task of the at least one intelligent mobile robot 104 and the recognized current state of each working region, and then sends a corresponding scheduling instruction to the at least one intelligent mobile robot 104 to instruct the at least one intelligent mobile robot 104 to move to the selected working region, for example, instruct the intelligent mobile robot 104 with the transporting task to move to the selected working region in the empty cargo space state to transport cargo, or instruct the intelligent mobile robot 104 with the task of picking up an empty pallet to move to the selected working region in the empty pallet state to pick up an empty pallet, or the like.

Figure 4:
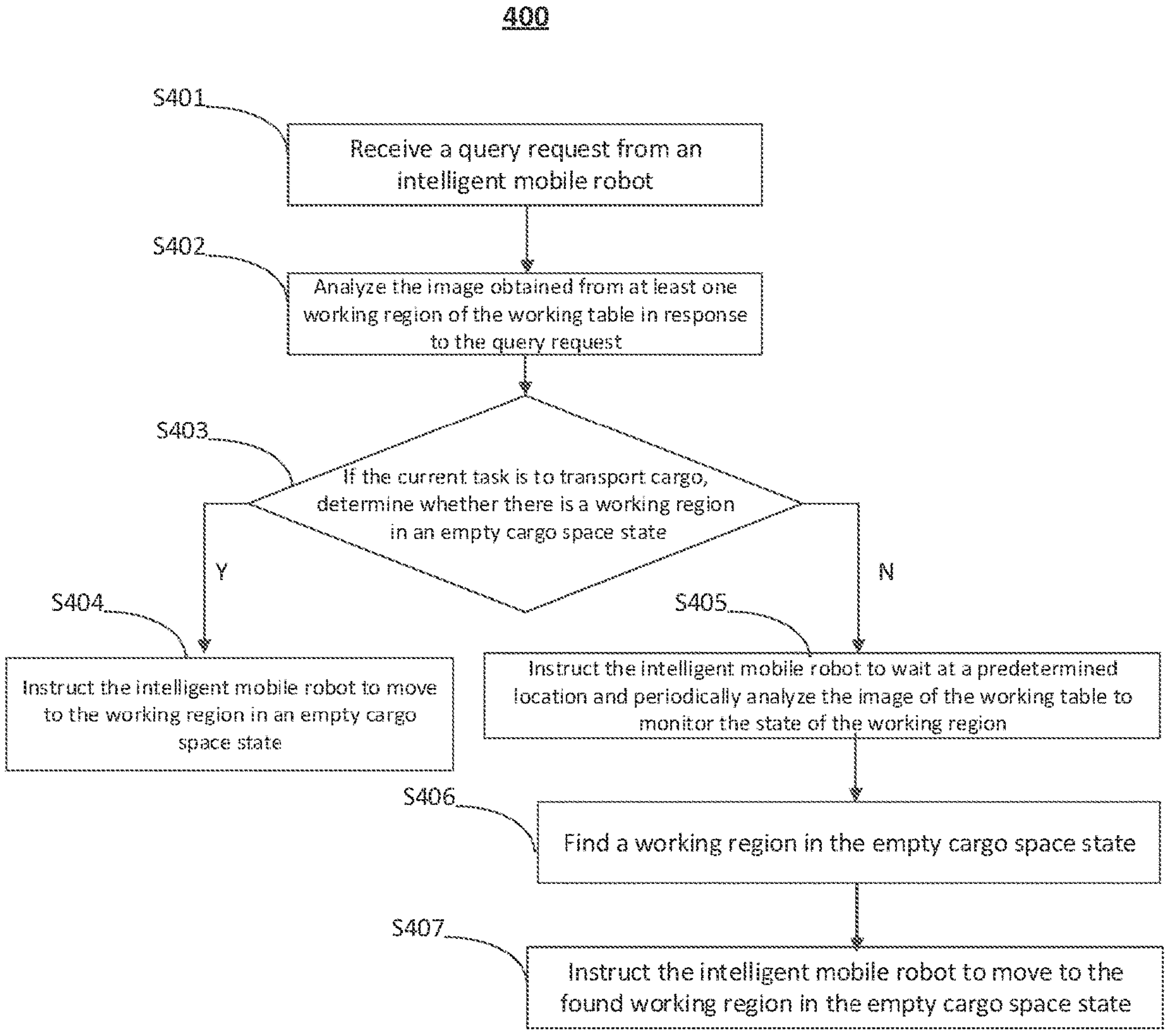
FIG. 4 illustrates a schematic flow chart of a scheduling method for managing an intelligent mobile robot according to an embodiment of the present invention when its task is to transport cargo.

FIG. 4 illustrates a schematic flow chart of a scheduling method 400 for managing an intelligent mobile robot 104 according to an embodiment of the present invention when its task is transporting cargo.

In an embodiment, as shown in FIG. 4, the scheduling method 400 may include the steps S401-S407.

In step S401, the processor 100 of the scheduling system receives a query request from at least one intelligent mobile robot 104.

In step S402, the processor 100 of the scheduling system obtains at least one image about the working region of the working table 102 in response to the query request, and analyzes the obtained image of the working region to recognize the current state of each working region. In an embodiment, the processor 100 of the scheduling system further analyzes a current frame of the obtained image to recognize a corresponding number of the at least one working region in the image.

In step S403, when determining at least according to the query request of the intelligent mobile robot 104 that the current task of the intelligent mobile robot 104 is to transport cargo, the processor 100 of the scheduling system determines whether there is currently a working region in the empty cargo space state.

When the determination result of step S403 is positive, that is, there is a working region in the empty cargo space state, step S404 of the scheduling method is performed.

In step S404, the processor 100 of the dispatching system instructs, according to the recognized number corresponding to the working region in the empty cargo space state, the intelligent mobile robot 104 to move to the working region with the number. In an embodiment, the intelligent mobile robot 104 may recognize the location of the working region with the number according to ground markings or an electronic map.

In an embodiment, in the case when the current task of the intelligent mobile robot 104 is to transport cargo, the intelligent mobile robot 104 sends a query request to the processor 100 of the scheduling system at a predetermined distance from the working table. The intelligent mobile robot 104 here may include one or more sensors and/or camera devices, with the help of which the intelligent mobile robot can detect the presence of an object nearby and the type of object and/or measure the distance from the object nearby. For example, the one or more sensors may be provided on the mobile base 1041. The sensors may include, for example, proximity sensors, sonar sensors, ultrasonic sensors, infrared sensors, radar sensors, LiDAR, or any combination thereof.

When the determination result of step S403 is negative, that is, there is no working region in the empty cargo space state, step S405 of the scheduling method is performed.

In step S405, the processor 100 of the scheduling system instructs the intelligent mobile robot 104 to wait at a predetermined location and periodically analyzes the image of the working table to monitor the state of at least one working region.

In step S406, the processor 100 of the dispatching system finds that there is a working region in the empty cargo space state, and then in step S407, instructs the intelligent mobile robot 104 to move to the found working region in the empty cargo space state.

Figure 5:
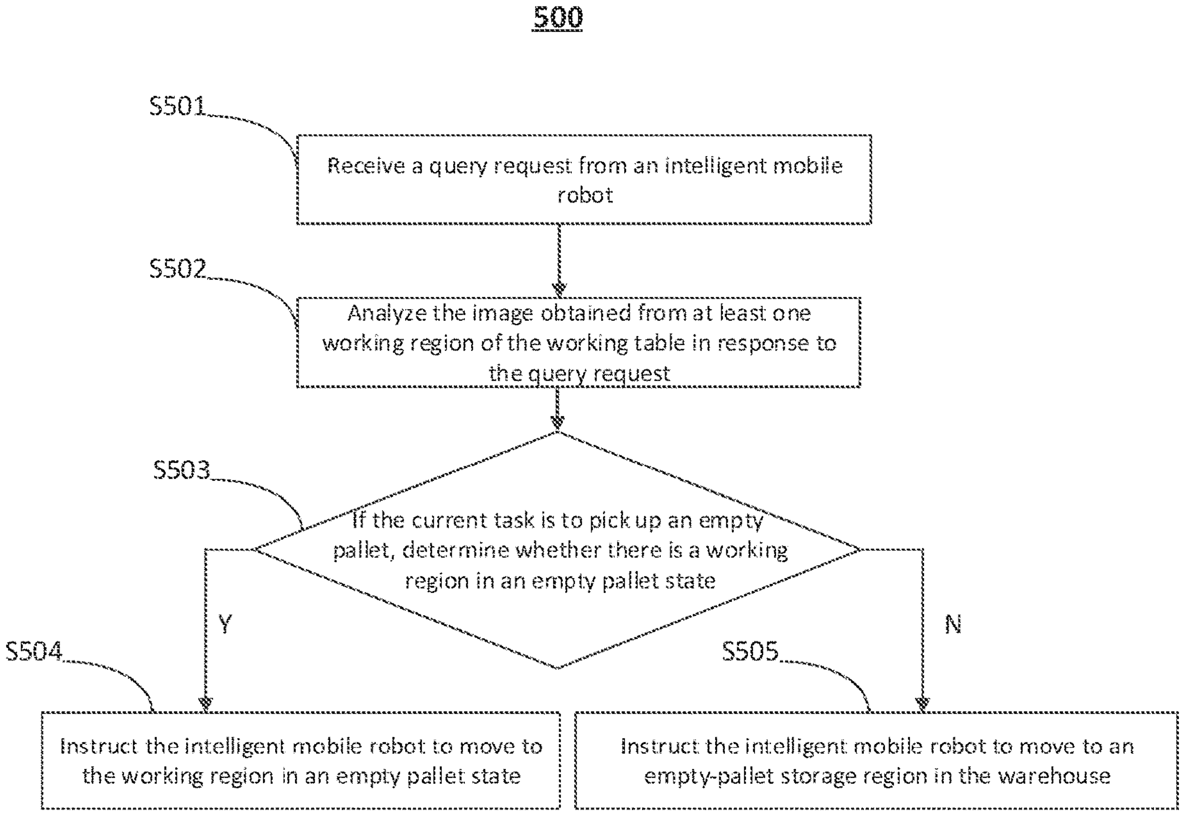
FIG. 5 illustrates a schematic flow chart of a scheduling method for managing an intelligent mobile robot according to an embodiment of the present invention when its task is to pick up an empty pallet.

FIG. 5 illustrates a schematic flow chart of a scheduling method 500 for managing an intelligent mobile robot 104 according to an embodiment of the present invention when its task is to pick up an empty pallet.

In an embodiment, as shown in FIG. 5, the scheduling method 500 may include steps S501-S505.

In step S501, the processor 100 of the scheduling system receives a query request from at least one intelligent mobile robot 104.

In step S502, the processor 100 of the scheduling system obtains an image about the at least one working region of the working table 102 in response to the query request, and analyzes the obtained image to recognize the current state of each working region. In an embodiment, the processor 100 of the scheduling system further analyzes a current frame of the obtained image to recognize a corresponding number of the at least one working region in the image.

In step S503, when determining at least according to the query request of the at least one intelligent mobile robot 104 that the current task of the at least one intelligent mobile robot 104 is to pick up an empty pallet, the processor 100 of the scheduling system determines whether there is currently a working region in the empty pallet state.

When the determination result of step S503 is positive, that is, there is a working region in the empty pallet state, step S504 of the scheduling method is performed. In step S504, the processor 100 of the scheduling system sends, according to the number corresponding to the selected working region in the empty pallet state, the number to the intelligent mobile robot to instruct the intelligent mobile robot 104 to move to the working region with the number in the empty pallet state.

When the determination result of step S503 is negative, that is, there is no working region in the empty cargo space state, step S505 of the scheduling method is performed. In step S505, the processor 100 of the scheduling system instructs the intelligent mobile robot 104 to move to an empty-pallet storage region (not shown) in the warehouse to pick up an empty pallet.

In an embodiment, the empty pallet present in the at least one working region of the working table 102 has a higher pickup priority than empty pallets in the empty-pallet storage region. For example, when the processor 100 of the scheduling system schedules a query request task associated with picking up an empty pallet, and recognizes the presence of a working region in the empty pallet state from an image of the at least one working region of the working table 102 obtained in response to the query request, priority will be given to moving to the working region in the empty pallet state to pick up an empty pallet, instead of moving to the empty-pallet storage region to pick up an empty pallet.

In another aspect of the present invention, further provided is a computer-readable storage medium having a computer program stored thereon, and the computer program, when executed by a processor, causes the steps of the scheduling method of the present invention to be performed. In an embodiment, the computer program is distributed across a plurality of network-coupled computer devices or processors such that the computer program is stored, accessed, and executed in a distributed fashion by one or more computer devices or processors. A single method step/operation, or two or more method steps/operations, may be performed by a single computer device or processor or by two or more computer devices or processors. One or more method steps/operations may be performed by one or more computer devices or processors, and one or more other method steps/operations may be performed by one or more other computer devices or processors. One or more computer devices or processors may perform a single method step/operation, or perform two or more method steps/operations.

Those of ordinary skill in the art can understand that all or some of the steps of the scheduling method for working region management of a working table of an intelligent mobile robot according to the present invention can be completed by instructing relevant hardware such as a computer device or processor through a computer program. The computer program may be stored in a non-transitory computer-readable storage medium, and when executed, the computer program causes the steps of the scheduling method for working region management of a working table of an intelligent mobile robot to be performed. Any reference herein to memory, storage, databases, or other media may include non-volatile and/or volatile memory, as appropriate. Examples of the non-volatile memory include a read-only memory (ROM), a programmable ROM (PROM), an electrically programmable ROM (EPROM), an electrically erasable programmable ROM (EEPROM), a flash memory, a magnetic tape, a floppy disk, a magneto-optical data storage device, an optical data storage device, a hard drive, a solid state drive. Examples of volatile memory include a random access memory (RAM) and an external cache memory.

In this description, whenever reference is made to "an embodiment," "another embodiment," "some embodiments," etc., it is meant that a particular feature, structure or characteristic described with respect to the embodiment is included in at least one embodiment of the invention. The appearances of these words in different places in this description do not necessarily refer to the same embodiment. In addition, when a particular feature, structure, or characteristic is described with respect to any embodiment, it will be understood that one skilled in the art will be able to implement such feature, structure, or characteristic in other embodiments in all of the described embodiments.

The technical features described above can be combined arbitrarily. Although not all possible combinations of these technical features have been described, any combination of these technical features should be considered to be covered by this description, as long as there is no contradiction in such combinations.

Although the present invention has been described in conjunction with embodiments, those skilled in the art will appreciate that various modifications and variations are possible without departing from the spirit and scope of the invention. Therefore, the scope of the invention should be defined by the scope of the appended claims.

What is claimed is:

1. A scheduling system, being configured to manage at least one intelligent mobile robot according to a state of a working table, the scheduling system comprising a processor, the processor being configured to:

obtain from a camera an image about at least one working region of the working table, where in the camera positioned above the working table and configured to capture an image about at least one working region of the working table in real time;

receive a query request from the at least one intelligent mobile robot, wherein the inquiry request comprises a request to proceed to the at least one working region to pick up cargo, transport cargo, or collect an empty pallet;

analyze the obtained image in response to the query request to recognize a current state of each working region of the at least one working region; and select a corresponding working region suitable for the at least one intelligent mobile robot from the at least one working region based on the query request and the recognized current state of each working region, and send a corresponding scheduling instruction to the at least one intelligent mobile robot to instruct the at least one intelligent mobile robot to move to the selected corresponding working region;

wherein the selecting the corresponding working region suitable for the at least one intelligent mobile robot from the at least one working region based on the query request and the recognized current state of each working region comprises, determining a current task of the at least one intelligent mobile robot at least according to the query request of the at least one intelligent mobile robot, and selecting from the at least one working region a suitable working region matching the current task of the at least one intelligent mobile robot based on the current task of the at least one intelligent mobile robot and the recognized current state of each working region.

2. The scheduling system according to claim 1, wherein the analyzing the obtained image to recognize the current state of each working region of the at least one working region comprises:

analyzing a current frame of the obtained image to recognize a corresponding number of each working region in the image and determine whether the state of each working region with the corresponding number is an available state or an occupied state.

3. The scheduling system according to claim 2, wherein the available state comprises an empty cargo space state or an empty pallet state.

4. The scheduling system according to claim 1, wherein the processor is further configured to:

when it is determined that the current task of the intelligent mobile robot is to transport cargo, send the scheduling instruction to instruct the intelligent mobile robot to move to a working region in the empty cargo space state; and/or when it is determined that the current task of the intelligent mobile robot is to pick up an empty pallet, send the scheduling instruction to instruct the intelligent mobile robot to move to a working region in the empty pallet state.

5. The scheduling system according to claim 1, the at least one intelligent mobile robot being configured to:

send the query request in a case of the intelligent mobile robot at a predetermined distance from the working table, when the current task of the intelligent mobile robot is to transport cargo; and/or immediately send the query request in a case when the current task of the intelligent mobile robot is to pick up an empty pallet.

6. The scheduling system according to claim 1, wherein the processor is further configured to:

in the case when the current task of the intelligent mobile robot is to transport cargo, instruct the intelligent mobile robot to wait at a predetermined position and regularly analyze the image of the working table to monitor the state of the at least one working region if it is determined according to the recognized current state of each working region that there is currently no working region in the empty cargo space state, and instruct the intelligent mobile robot to move to a working region in the empty cargo space state if a working region in the empty cargo space state is found; and/or in the case when the current task of the intelligent mobile robot is to pick up an empty pallet, instruct the intelligent mobile robot to move to an empty-pallet storage region to pick up an empty pallet if it is determined according to the recognized current state of each working region that there is currently no working region in the empty pallet state.

7. A scheduling method, being configured to manage at least one intelligent mobile robot according to a state of a working table, the scheduling method comprising executing computer instructions to perform the following operations:

obtaining from a camera an image about at least one working region of the working table, where in the camera positioned above the working table and configured to capture an image about at least one working region of the working table in real time;

receiving a query request from the at least one intelligent mobile robot, wherein the inquiry request comprises a request to proceed to the at least one working region to pick up cargo, transport cargo, or collect an empty pallet;

analyzing the obtained image in response to the query request to recognize a current state of each working region of the at least one working region; and selecting a corresponding working region suitable for the at least one intelligent mobile robot from the at least one working region on the basis of the query request and the recognized current state of each working region, and sending a corresponding scheduling instruction to the at least one intelligent mobile robot to instruct the at least one intelligent mobile robot to move to the selected corresponding working region, wherein the selecting the corresponding working region suitable for the at least one intelligent mobile robot from the at least one working region based on the query request and the recognized current state of each working region comprises;

determining a current task of the at least one intelligent mobile robot at least according to the query request of the at least one intelligent mobile robot, and selecting from the at least one working region a suitable working region matching the current task of the at least one intelligent mobile robot based on the current task of the at least one intelligent mobile robot and the recognized current state of each working region.

8. The scheduling method according to claim 7, wherein analyzing the obtained image to recognize the current state of each working region of the at least one working region comprises:

analyzing a current frame of the obtained image to recognize a corresponding number of each working region in the image and determine whether the state of each working region with the corresponding number is an available state or an occupied state.

9. The scheduling method according to claim 8, wherein the available state comprises an empty cargo space state and an empty pallet state.

10. The scheduling method according to claim 9, further comprising:

when it is determined that the current task of the intelligent mobile robot is to transport cargo, sending the scheduling instruction to instruct the intelligent mobile robot to move to a working region in the empty cargo space state; and/or when it is determined that the current task of the intelligent mobile robot is to pick up the empty pallet, sending the scheduling instruction to instruct the intelligent mobile robot to move to a working region in the empty pallet state.

11. The scheduling method according to claim 7, wherein the at least one intelligent mobile robot is configured to:

send the query request in a case of the intelligent mobile robot at a predetermined distance from the working table, when the current task of the intelligent mobile robot is to transport cargo; and/or immediately send the query request in a case when the current task of the intelligent mobile robot is to pick up the empty pallet.

12. The scheduling method according to claim 7, further comprising:

in the case when the current task of the intelligent mobile robot is to transport cargo, instructing the intelligent mobile robot to wait at a predetermined position and regularly analyzing the image of the working table to monitor the state of the at least one working region if it is determined according to the recognized current state of the at least one working region that there is currently no working region in the empty cargo space state, and instructing the intelligent mobile robot to move to a working region in the empty cargo space state if a working region in the empty cargo space state is found;

and/or in the case when the current task of the intelligent mobile robot is to pick up an empty pallet, instructing the intelligent mobile robot to move to an empty-pallet storage region to pick up the empty pallet if it is determined according to the recognized current state of at least one working region that there is currently no working region in the empty pallet state.

13. A non-transitory computer-readable storage medium having computer instructions stored thereon, wherein the computer instructions, when executed by a processor, cause the scheduling method according to claim 7 to be implemented.

* * * * *